United States Patent
Zhang et al.

(10) Patent No.: US 12,504,416 B2
(45) Date of Patent: Dec. 23, 2025

(54) SURFACE WATER QUALITY MONITORING METHOD BASED ON HIGH SPATIAL RESOLUTION SATELLITE

(71) Applicants: WUHAN UNIVERSITY, Wuhan (CN); CHINA YANGTZE POWER CO., LTD., Yichang (CN)

(72) Inventors: Yanjun Zhang, Wuhan (CN); Anni Qiu, Wuhan (CN); Wenxun Dong, Wuhan (CN); Lan Luo, Wuhan (CN); Yuanxin Song, Wuhan (CN); Zhengfeng Bao, Yichang (CN); Hui Cao, Yichang (CN); Xinbo Liu, Yichang (CN); Xuetao Zeng, Wuhan (CN)

(73) Assignees: WUHAN UNIVERSITY, Wuhan (CN); CHINA YANGTZE POWER CO., LTD., Yichang (CN)

( * ) Notice: Subject to any disclaimer, the term of this patent is extended or adjusted under 35 U.S.C. 154(b) by 225 days.

(21) Appl. No.: 18/415,659

(22) Filed: Jan. 18, 2024

(65) Prior Publication Data
US 2024/0151703 A1    May 9, 2024

Related U.S. Application Data

(63) Continuation of application No. PCT/CN2023/114422, filed on Aug. 23, 2023.

(30) Foreign Application Priority Data

Aug. 24, 2022  (CN) .......................... 202211016171.4

(51) Int. Cl.
*G01N 33/18*    (2006.01)
*G01N 1/10*    (2006.01)
(Continued)

(52) U.S. Cl.
CPC ............... *G01N 33/18* (2013.01); *G01N 1/10* (2013.01); *G01N 21/8851* (2013.01);
(Continued)

(58) Field of Classification Search
CPC ...... G01N 33/18; G01N 1/10; G01N 21/8851; G01N 21/94; G01N 2021/178;
(Continued)

(56) References Cited

FOREIGN PATENT DOCUMENTS

| CN | 108195775 A | 6/2018 |
|---|---|---|
| CN | 109959621 A | 7/2019 |

(Continued)

*Primary Examiner* — Jamil Ahmed
(74) *Attorney, Agent, or Firm* — Bayramoglu Law Offices LLC

(57) ABSTRACT

A surface water quality monitoring method based on a high spatial resolution satellite includes: step 1. building standard surface water quality pools by mixing natural water bodies with clean water in different proportions to obtain surface water quality data; step 2. obtaining high spatial resolution remote sensing images for processing; step 3. identifying remote sensing bands with higher correlation through correlation analysis by presetting ratio values of remote sensor data bands and the standard surface water quality pools; step 4. building a water quality parameter retrieval model, and comparing and retrieving the remote sensing bands with higher correlation and the surface water quality data to obtain water quality data; and step 5. identifying abnormal points of the water quality based on the water quality data and water quality data threshold of the surface water.

10 Claims, 3 Drawing Sheets

(51) Int. Cl.
 *G01N 21/17* (2006.01)
 *G01N 21/88* (2006.01)
 *G01N 21/94* (2006.01)

(52) U.S. Cl.
 CPC ....... *G01N 21/94* (2013.01); *G01N 2021/178* (2013.01); *G01N 2021/1793* (2013.01); *G01N 2021/8887* (2013.01); *G01N 2021/945* (2013.01)

(58) Field of Classification Search
 CPC ... G01N 2021/1793; G01N 2021/8887; G01N 2021/945
 See application file for complete search history.

(56) References Cited

FOREIGN PATENT DOCUMENTS

| | | | | |
|---|---|---|---|---|
| CN | 110672805 A | * | 1/2020 | ............. G01N 33/18 |
| CN | 112051222 A | | 12/2020 | |
| CN | 112464746 A | | 3/2021 | |
| CN | 114863294 A | | 8/2022 | |
| CN | 115907267 A | | 4/2023 | |
| KR | 20140062756 A | | 5/2014 | |

\* cited by examiner

SURFACE WATER QUALITY MONITORING METHOD BASED ON HIGH SPATIAL RESOLUTION SATELLITE

CROSS-REFERENCE TO THE RELATED APPLICATIONS

This application is a continuation application of International Application No. PCT/CN2023/114422, filed on Aug. 23, 2023, which is based upon and claims priority to Chinese Patent Application No. 202211016171.4, filed on Aug. 24, 2022, the entire contents of which are incorporated herein by reference.

TECHNICAL FIELD

The present disclosure belongs to the technical field of surface water quality monitoring, and particularly relates to a surface water quality monitoring method based on a high spatial resolution satellite.

BACKGROUND

As a source of life, a necessity for production and a cornerstone of ecology, water is an indispensable essential need and condition for human survival and development. With the rapid development of social economy and the acceleration of urbanization, water scarcity and serious water pollution have become major constraints on the sustainable development of national economy in China. Therefore, more rigorous requirements are raised for water quality monitoring.

Compared with traditional methods of water quality monitoring, remote sensing has irreplaceable advantages in monitoring the water quality, such as abundant data, strong periodicity, low cost and wide coverage. Furthermore, the massive amount of data and the spatio-temporal integrity created by remote sensing can facilitate analysis and prediction of spatio-temporal distribution changes of water quality, and further help to discover some pollution sources and pollutant migration characteristics that are difficulty to be revealed by means of conventional methods. Nevertheless, remote sensing technology still relies on surface water quality data for retrieval, which requires the establishment of surface water quality monitoring means adapted to the remote sensing technology. Currently, the remote sensing technology primarily relies on data from ground monitoring stations that are limited in number, distributed unevenly and built in a costly manner, as well as easy confusion of a large number of samples caused by multi-batch sampling by test tubes, varying sampling time points and reagent batches, and difficulty in safekeeping of preserve water samples. Overall, the technology generally has the disadvantages of being time-consuming and labor-intensive, causing excessive errors and generating unstable results.

SUMMARY

In order to solve the above technical problems, the present disclosure provides a surface water quality monitoring method based on a high spatial resolution satellite, enabling efficient and convenient monitoring of water quality of target water bodies.

The surface water quality monitoring method based on a high spatial resolution satellite provided in the present disclosure includes the following steps:

step 1. building standard surface water quality pools by mixing natural water bodies with clean water in different proportions to obtain surface water quality data; and the standard surface water quality pools include: a standard pool A for containing clean water, a standard pool B for containing natural water, standard pools C, D and E, each of which contains a mixture of clean water and natural water, and the clean water therein accounts for $n_1$, $n_2$ and $n_3$ of the total mixture, respectively, with $n_1$, $n_2$ and $n_3$ different from one another; and a water quality monitoring device is arranged to obtain water quality data of the natural water in the standard pool B;

step 2. obtaining high spatial resolution remote sensing images of lakes, reservoirs and rivers, and preprocessing and cropping the remote sensing images;

step 3. identifying remote sensing bands with higher correlation through correlation analysis by presetting ratio values of remote sensor data bands obtained in the step 2 and the standard surface water quality pools in the step 1;

step 4. building a water quality parameter retrieval model, and comparing and retrieving the remote sensing bands with higher correlation obtained in the step 3 and the surface water quality data obtained in the step 1 to obtain water quality data of an entire lake and river; and step 5. identifying abnormal points of the water quality based on the water quality data of the entire lake and river obtained in the step 4 and a preset water quality data threshold, and identifying areas with excessive pollutant concentrations.

Preferably, the surface water quality monitoring method based on a high spatial resolution satellite provided in the present disclosure further has the following features, where in the step 1, each standard pool is provided with a valve; and a revisit period of a satellite that acquires remote sensing images is taken as a period for updating the water in each pool to remix and update the water bodies therein.

Preferably, the surface water quality monitoring method based on a high spatial resolution satellite provided in the present disclosure further has the following features, where in the step 1, a length and a width of each standard pool should be no less than three times resolution of the remote sensing images.

Preferably, the surface water quality monitoring method based on a high spatial resolution satellite provided in the present disclosure further has the following features, where in the step 1, there are more than three standard pools for containing the mixed water, and at least three of these standard pools used for containing the mixed water have different proportions of the clean water.

Preferably, the surface water quality monitoring method based on a high spatial resolution satellite provided in the present disclosure further has the following features, where in the step 1, $n_1=½$, $n_2=⅔$ and $n_3=⅓$.

Preferably, the surface water quality monitoring method based on a high spatial resolution satellite provided in the present disclosure further has the following features, where in the obtained resolution of the high spatial resolution remote sensing images obtained should not exceed 1 m.

Preferably, the surface water quality monitoring method based on a high spatial resolution satellite provided in the present disclosure further has the following features, where in the step 3, concentration ratios of pollutants in each of the standard pools can be determined according to a ratio of the natural water bodies to the clean water therein, and remote sensing bands having better adaptability and higher correlation with the concentration ratios of pollutants can be finally determined through correlation analysis.

Preferably, the surface water quality monitoring method based on a high spatial resolution satellite provided in the present disclosure further has the following features, where a plurality of bands with higher correlation can be obtained through the correlation analysis, and at least the top three bands can be selected, or those bands with correlation coefficients exceeding a certain value can be selected.

Preferably, the surface water quality monitoring method based on a high spatial resolution satellite provided in the present disclosure further has the following features, where in the step 3, the correlation analysis is performed by presetting ratio values of remote sensor data bands and the standard surface water quality pools, $X_1$ represents a remote sensing band matrix, and $Y_1$ represents a preset ratio value matrix of pollutant concentrations; and through the correlation analysis thereof, a correlation coefficient matrix $R_1$ of each band and the preset ratio value matrix of pollutant concentrations is obtained:

$$X_1 = \begin{bmatrix} X_A^I & X_A^{II} & X_A^{III} & X_A^{IV} & X_A^V & X_A^{VI} \\ X_B^I & X_B^{II} & X_B^{III} & X_B^{IV} & X_B^V & X_B^{VI} \\ X_C^I & X_C^{II} & X_C^{III} & X_C^{IV} & X_C^V & X_C^{VI} \\ X_D^I & X_D^{II} & X_D^{III} & X_D^{IV} & X_D^V & X_D^{VI} \\ X_E^I & X_E^{II} & X_E^{III} & X_E^{IV} & X_E^V & X_E^{VI} \end{bmatrix}$$

in the equation, subscripts A-E represent numbering of the standard pools, superscripts I, II, III, IV, V and VI represent band categories, and XV denotes a value of a band I of the standard pool A:

$$Y_1 = \begin{bmatrix} 0 \\ 1 \\ 1/n_1 \\ 1/n_2 \\ 1/n_3 \end{bmatrix}$$

$$R_1 = \begin{bmatrix} r^I & r^{II} & r^{III} & r^{IV} & r^V & r^{VI} \end{bmatrix}$$

finding and selecting a plurality of bands with values ranking top in $R_1$ or selecting those bands with correlation coefficients exceeding a certain value as remote sensing bands with higher correlation.

Preferably, the surface water quality monitoring method based on a high spatial resolution satellite provided in the present disclosure further has the following features, where in the step 4, data of monitoring points, that is, a spectral reflectance correlation model, is retrieved and obtained by optimizing the model according to data of the standard surface water quality pools and data of spectral reflectance of the corresponding monitoring stations, and the like, and the accuracy of the model is tested with a multiple correlation coefficient $R^2$, the optimal retrieval band and band combination of each water quality index are determined by performing statistical analysis of the correlation between each band, band combination and corresponding water quality index data, and a retrieval regression model of each pollutant concentration is then built. The water quality parameter retrieval model includes but is not limited to a partial least squares method.

Preferably, the surface water quality monitoring method based on a high spatial resolution satellite provided in the present disclosure further has the following features, where in the step 5, the overall water quality and water quality distribution can be identified based on the water quality data of the entire lake and river obtained in the step 4 and the preset water quality data threshold, and notification and early warning can be accordingly given. In the step 5, extracted results include the overall water quality, water quality distribution and abnormal point investigation results, which can be used to identify various pollutants, including but not limited to COD, total phosphorus and total nitrogen.

Effects and Benefits of the Present Disclosure

1. The present disclosure features time and labor savings, and is capable of greatly reducing the number of water quality monitoring stations required.
2. In the technical solution of the present disclosure, the standard surface water quality pools are built, and a set of water quality monitoring device is arranged for obtaining data of more regions, further facilitating the establishment of correlation between bands and pollutant concentrations.
3. Compared with the result instability of the traditional methods caused by such possible factors as varying sampling time points and different batches of reagents, the present disclosure is capable of obtaining more stable and effective results.
4. The present disclosure is capable of identifying more applicable remote sensing bands with higher correlation.
5. The present disclosure is capable of obtaining the overall water quality conditions of the lakes, reservoirs and rivers.
6. The present disclosure is capable of effectively identifying abnormalities, and monitoring and giving early warning for large-scale pollution or abnormal leakage.
7. The present disclosure is capable of effectively cutting down costs, the use of water quality monitoring reagents, and the like.

In summary, the present disclosure is capable of rapidly detecting the water quality of the target water bodies in a more efficient and convenient manner. Further, it is capable of effectively reducing costs and the number of water quality monitoring experiments, and identifying the abnormal pollution points, which is conducive to early warning of sudden pollution incidents and investigation of pollution sources. The method provided in the present disclosure is very suitable for large-scale promotion due to its convenience for building, easiness to maintain, good effect and high efficiency.

DETAILED DESCRIPTIONS OF THE EMBODIMENTS

A surface water quality monitoring method based on a high spatial resolution satellite provided in the present disclosure will be described in details in conjunction with the accompanying drawings.

Embodiment

Figure 1:
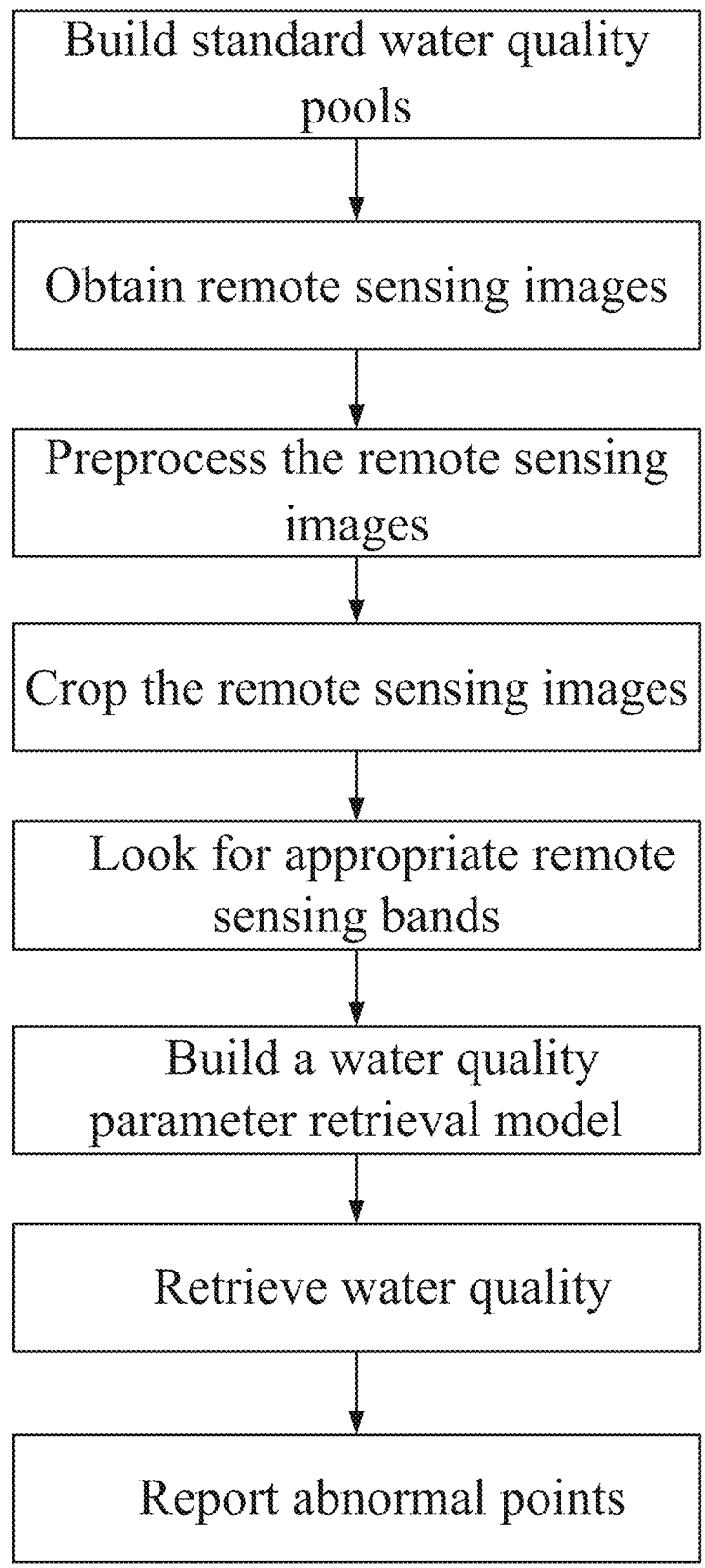
FIG. 1 is a flowchart of a surface water quality monitoring method based on a high spatial resolution satellite in an embodiment of the present disclosure.

As shown in FIG. 1, the surface water quality monitoring method based on a high spatial resolution satellite provided in this embodiment includes the following steps:

S1. building standard surface water quality pools by mixing natural water bodies with clean water in different proportions to obtain surface water quality data; and the "building standard surface water quality pools" further includes two steps: first, building the pools and then filling the pools with water bodies of different concentration gradients, and a length and a width of each pool should be no less than three times resolution of the remote sensing images. In this embodiment, the length×width×height of each of the standard pools is 3 m×3 m×1 m.

Figure 2:
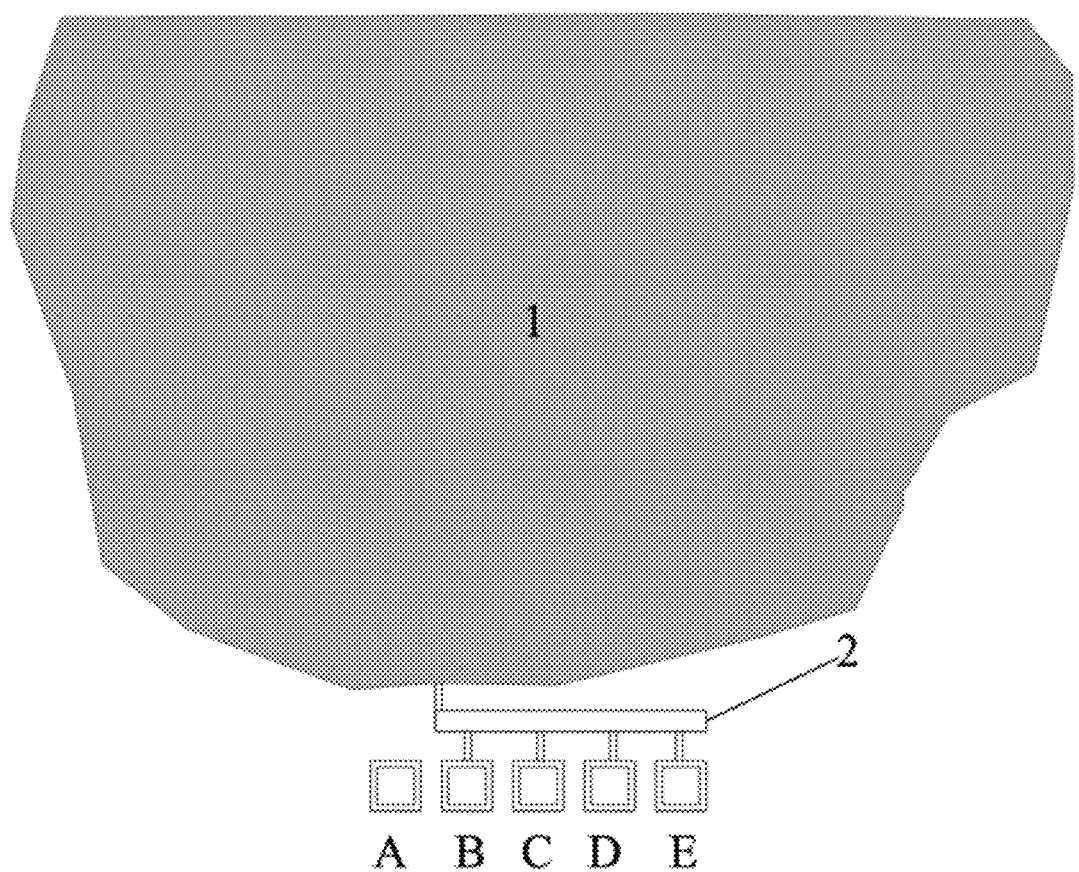
FIG. 2 is a schematic diagram of locations of standard surface water quality pools in an embodiment of the present disclosure.
Figure 3:
FIG. 3 is a satellite image simulation diagram in an embodiment of the present disclosure.

As shown in FIG. 2, five standard pools (A-E) are built on one side of a river/lake 1, and the standard pools B-E are all connected to the river/lake 1 through a natural water body connecting pipeline 2. Specifically, the standard pool A is filled with clean water, the standard pool B is filled with natural water, $1/n_1$ of the standard pool C is filled with natural water and the rest thereof is filled with clean water, $1/n_2$ of the standard pool D is filled with natural water and the rest thereof is filled with clean water, and $1/n_3$ of the standard pool E is filled with natural water and the rest thereof is filled with clean water. In order to ensure that the natural water in the standard pools are consistent with that in the natural water body 1, a valve is installed at an inlet of each of the standard pools, the natural water is pumped into each of the standard pools, the water bodies in each of the pools are remixed and updated by taking a satellite revisit period as a period, and a simulated satellite image is shown in FIG. 3. A set of water quality monitoring device is arranged in the standard pool B. In this embodiment, $n_1$, $n_2$ and $n_3$ are ½, ⅔ and ⅓, respectively.

S2. Obtaining high spatial resolution remote sensing images of lakes, reservoirs and rivers, and preprocessing and cropping the acquired remote sensing images; and satellite remote sensing adopts high spatial resolution remote sensing, and the accuracy of water quality monitoring can be improved when ground resolution of the high spatial resolution remote sensing is less than 1 m.

Image preprocessing involves radiometric calibration, atmospheric correction and geometric correction. Specifically, radiometric calibration is a process of converting the brightness grayscale values of the images into absolute radiance values. Atmospheric correction is a process of eliminating radiation errors caused by atmospheric effects and retrieving the true surface reflectance of a ground object. Geometric correction is a process of correcting and eliminating distortions in geometric positions, shapes, sizes, orientations, and the like of various ground objects in original images that are inconsistent with the expression requirements in a reference system, and the distortions result from deformation of photographic materials, distortion of objective lens, atmospheric refraction, Earth curvature, Earth rotation, topographic relief, and the like.

S3. Identifying remote sensing bands with higher correlation through correlation analysis by presetting ratio values of remote sensor data bands obtained in the S2 and the standard surface water quality pools in the S1; and performing the correlation analysis by presetting ratio values of remote sensor data bands and the standard surface water quality pools, where $X_1$ represents a remote sensing band matrix, and $Y_1$ represents a preset ratio value matrix of pollutant concentrations. Through the correlation analysis thereof, a correlation coefficient matrix $R_1$ of each band and the preset ratio value matrix of pollutant concentrations is obtained, and three bands with the largest correlation coefficients thereof are selected.

$$X_1 = \begin{bmatrix} X_A^I & X_A^{II} & X_A^{III} & X_A^{IV} & X_A^V & X_A^{VI} \\ X_B^I & X_B^{II} & X_B^{III} & X_B^{IV} & X_B^V & X_B^{VI} \\ X_C^I & X_C^{II} & X_C^{III} & X_C^{IV} & X_C^V & X_C^{VI} \\ X_D^I & X_D^{II} & X_D^{III} & X_D^{IV} & X_D^V & X_D^{VI} \\ X_E^I & X_E^{II} & X_E^{III} & X_E^{IV} & X_E^V & X_E^{VI} \end{bmatrix}$$

in the equation, subscripts A-E represent numbering of the standard pools, and superscripts I, II, III, IV, V and VI represent band categories. For example, $X_A^I$ denotes a value of a band I of the standard pool A(3).

$$Y_1 = \begin{bmatrix} 0 \\ 1 \\ 1/n_1 \\ 1/n_2 \\ 1/n_3 \end{bmatrix}$$

$$R_1 = \begin{bmatrix} r^I & r^{II} & r^{III} & r^{IV} & r^V & r^{VI} \end{bmatrix}$$

Specific calculations are shown below:

$$X_1 = \begin{bmatrix} 360 & 585 & 573 & 885 & 546 & 375 \\ 498 & 632 & 435 & 424 & 283 & 184 \\ 190 & 369 & 306 & 433 & 310 & 221 \\ 355 & 543 & 377 & 555 & 298 & 190 \\ 443 & 714 & 446 & 431 & 175 & 109 \end{bmatrix}$$

It can be seen from the S1 that $n_1=½$, $n_2=⅔$ and $n_3=⅓$ in this embodiment, therefore:

$$Y_1 = \begin{bmatrix} 0 \\ 1 \\ 1/2 \\ 2/3 \\ 1/3 \end{bmatrix}$$

$$R_1 = \begin{bmatrix} 0.312 & 0.026 & 0.548 & 0.713 & 0.547 & 0.561 \end{bmatrix}$$

Bands III, IV and VI are accordingly selected.

S4. building a water quality parameter retrieval model, and comparing and retrieving the remote sensing bands with higher correlation obtained in the S and the surface water quality data obtained in the S1 to obtain water quality data of an entire lake and river; and data of monitoring points, that is, a spectral reflectance correlation model, is retrieved and obtained by optimizing the model according to data of the standard surface water quality pools and data of spectral reflectance of the corresponding monitoring stations by mean of a partial least squares method, and the like, and the accuracy of the model is tested with a multiple correlation coefficient $R^2$, that is, the optimal retrieval band and band combination of each water quality index are determined by performing statistical analysis of the correlation between each band, band combination and corresponding water quality index data, and a retrieval regression model of each pollutant concentration is then built.

The partial least squares method has the following steps:
1. establishing an independent variable set (taking the largest correlation coefficient in the bands III, IV, VI as an example):

$$X = \begin{bmatrix} X_A^{III} & X_A^{IV} & X_A^{VI} \\ X_B^{III} & X_B^{IV} & X_B^{VI} \\ X_C^{III} & X_C^{IV} & X_C^{VI} \\ X_D^{III} & X_D^{IV} & X_D^{VI} \\ X_E^{III} & X_E^{IV} & X_E^{VI} \end{bmatrix}$$

in the equation, the subscript A represents numbering of the standard pool, and the superscripts I, II, III, IV, V and VI represent band categories. For example, $X_A^{III}$ denotes a value of a band IIII of the standard pool A(3).

2. Establishing a dependent variable set
water quality tests need to be performed on the standard pool B at regular intervals to obtain:

$$Y = \begin{bmatrix} 0 & C_{COD} & 1/2C_{COD} & 2/3C_{COD} & 1/3C_{COD} \\ 0 & C_{TP} & 1/2C_{TP} & 2/3C_{TP} & 1/3C_{TP} \\ 0 & C_{TN} & 1/2C_{TN} & 2/3C_{TN} & 1/3C_{TN} \end{bmatrix}$$

in the equation, $C_{COD}$, CTP and $C_{TN}$ represent measured values of COD, TP and TN in the natural water.

3. Standardizing X and Y as $E_0$ and $F_0$, respectively, and fining a rank h of X.
4. Finding a unit eigenvector ω1 corresponding to the largest eigenvalue of the matrix $E_0^T F_0 F_0^T E_0$, with a corresponding component $t_1$:

$$t_1 = E_0 \omega_1$$
$$E_1 = E_0 - t_1 p_1^T$$
$$p_1 = \frac{E_0^T t_1}{\|t_1\|^2}$$

5. Finding a unit eigenvector $\omega_2$ corresponding to the largest eigenvalue of the matrix $E_1^T F_0 F_0^T E_1$, with a corresponding component $t_2$:

$$t_2 = E_1 \omega_2$$
$$E_2 = E_1 - t_2 p_2^T$$
$$p_2 = \frac{E_2^T t_2}{\|t_2\|^2}$$

6. Repeating the steps to find a unit eigenvector $\omega_h$ corresponding to the largest eigenvalue of the matrix $E_{h-1}^T F_0 F_0^T E_{h-1}$, with a corresponding component $t_h$.
7. Obtaining an ordinary least squares regression equation of $F_0$ on $t_1, \ldots, t_h$:

$$F_0 = t_1 r_1^T + t_2 r_2^T + \ldots + t_h r_h^T + F_m$$

$$r_i = \frac{F_0^T t_i}{\|t_i\|^2}, i = 1, 2, \ldots, h$$

Specific calculations are shown below:
it is measured that $C_{TN}$, is 1.8 mg/L.

$$X_1 = \begin{bmatrix} 573 & 885 & 375 \\ 435 & 424 & 184 \\ 306 & 433 & 221 \\ 377 & 555 & 190 \\ 446 & 431 & 109 \end{bmatrix}$$

$$Y = [0 \quad 1.8 \quad 0.9 \quad 1.2 \quad 0.6]$$

$$Y = 2.20 + 0.000486 * X^{III} - 0.00411 * X^{IV} + 0.00342 X^{VI}$$

in the equation, Y represents a total nitrogen value, $X^{III}$ represents a band value at a calculation point III, $X^{IV}$ represents a band value at a calculation point IV, and $X^{VI}$ represents a band value at a calculation point VI.

A pollutant concentration value of the entire lake and river can be calculated according to a comparison expression between the obtained pollutant concentration values and the bands.

S5. Investigating and reporting abnormal points based on the water quality data of the entire lake and river obtained in the step 4 and a preset water quality data threshold.

In this embodiment, the water quality data threshold is preset as follows: the pollutant concentration reaches up to five times the surrounding pollutant concentration, and the pollutant concentration meets the standards for Class V water of the surface water.

Therefore, an abnormal point refers to a point where the pollutant concentration exceeds five times the surrounding pollutant concentration and goes against the standards for Class V water of the surface water. Any abnormal point, once being identified, should be reported for further investigating the causes, that is, the following conditions are satisfied: $y_{i,k} > 5 \times y_{i,j}$ & $y_{i,k} > x_i$, where $y_{i,k}$ represents a concentration of a pollutant i at a point K (i=1, 2, 3, denoting COD, total phosphorus and total nitrogen, respectively), $y_{i,j}$ represents a concentration of the pollutant i at a point J (the point J meets the conditions: D<3×d, where D represents a distance between the point J and the point K, and a point d is satellite spatial resolution), and $x_i$ represents a standard concentration of Class V water of the surface water corresponding to the pollutants ($x_1$=40 mg/L, $x_2$=0.4 mg/L and $x_3$=2.0 mg/L).

The above embodiment is only illustration of the technical solution of the present disclosure. The surface water quality monitoring method based on a high spatial resolution satellite provided in the present disclosure is not limited to the content described in the above embodiments, but is subject to the scope defined by the claims. Any modifications, additions or equivalent substitutions made by those skilled in the art based on the embodiments fall within the scope of protection of the claims of the present disclosure.

What is claimed is:
1. A surface water quality monitoring method based on a high spatial resolution satellite, comprising the following steps:
   step 1: building standard surface water quality pools by mixing natural water bodies with clean water in different proportions to obtain surface water quality data; and the standard surface water quality pools comprise: a standard pool A for containing clean water, a standard pool B for containing natural water, standard pools C, D and E for containing a mixture of clean water and natural water, and the clean water therein accounts for $n_1$, $n_2$ and $n_3$ of the total mixture, respectively, with $n_1$, $n_2$ and $n_3$ different from one another; and a water quality monitoring device is arranged to obtain water quality data of the natural water in the standard pool B;

step 2: obtaining high spatial resolution remote sensing images of lakes, reservoirs and rivers, and preprocessing and cropping the high spatial resolution remote sensing images;

step 3: identifying remote sensing bands with higher correlation through correlation analysis by presetting ratio values of remote sensor data bands obtained in the step 2 and the standard surface water quality pools in the step 1;

step 4: building a water quality parameter retrieval model, and comparing and retrieving the remote sensing bands with higher correlation obtained in the step 3 and the surface water quality data obtained in the step 1 to obtain water quality data of an entire lake and river;

step 5: identifying abnormal points of the water quality based on the water quality data of the entire lake and river obtained in the step 4 and a preset water quality data threshold, and identifying areas with excessive pollutant concentrations.

2. The surface water quality monitoring method based on the high spatial resolution satellite according to claim 1, wherein in the step 1, each of the standard pools A, B, C, D and E is provided with a valve; a revisit period of a satellite is taken as a period for updating the water in each of the standard pools A, B, C, D, and E to remix and update the water bodies therein, wherein the satellite acquires the high spatial resolution remote sensing images.

3. The surface water quality monitoring method based on the high spatial resolution satellite according to claim 1, wherein in the step 1, a length and a width of each of the standard pools A, B, C, D, and E should be greater than or equal to three times resolution of the high spatial resolution remote sensing images.

4. The surface water quality monitoring method based on the high spatial resolution satellite according to claim 1, wherein in the step 1, there are more than three standard pools for containing the mixed water, and at least three of these standard pools used for containing the mixed water have different proportions of the clean water.

5. The surface water quality monitoring method based on the high spatial resolution satellite according to claim 1, wherein in the step 1, $n_1=½$, $n_2=⅔$ and $n_3=⅓$.

6. The surface water quality monitoring method based on the high spatial resolution satellite according to claim 1, wherein in the step 2, the obtained resolution of the high spatial resolution remote sensing images obtained should not exceed 1 m.

7. The surface water quality monitoring method based on the high spatial resolution satellite according to claim 1, wherein in the step 3, concentration ratios of pollutants in each of the standard pools A, B, C, D, and E are allowed to be determined according to a ratio of the natural water bodies to the clean water therein, remote sensing bands having better adaptability and higher correlation with the concentration ratios of pollutants are allowed to be determined through the correlation analysis, and at least top three bands are allowed to be selected, or those bands with correlation coefficients exceeding a predetermined value are allowed to be selected.

8. The surface water quality monitoring method based on the high spatial resolution satellite according to claim 1, wherein in the step 3, the correlation analysis is performed by presetting ratio values of remote sensor data bands and the standard surface water quality pools, $X_1$ represents a remote sensing band matrix, and $Y_1$ represents a preset ratio value matrix of pollutant concentrations; and through the correlation analysis thereof, a correlation coefficient matrix $R_1$ of each band and the preset ratio value matrix of pollutant concentrations is obtained:

$$X_1 = \begin{bmatrix} X_A^I & X_A^{II} & X_A^{III} & X_A^{IV} & X_A^V & X_A^{VI} \\ X_B^I & X_B^{II} & X_B^{III} & X_B^{IV} & X_B^V & X_B^{VI} \\ X_C^I & X_C^{II} & X_C^{III} & X_C^{IV} & X_C^V & X_C^{VI} \\ X_D^I & X_D^{II} & X_D^{III} & X_D^{IV} & X_D^V & X_D^{VI} \\ X_E^I & X_E^{II} & X_E^{III} & X_E^{IV} & X_E^V & X_E^{VI} \end{bmatrix}$$

in the equation, subscripts A-E represent numbering of the standard pools, and superscripts I, II, III, IV, V and VI represent band categories, wherein $X_A^I$ denotes a value of a band I of the standard pool A; and $$Y_1 = \begin{bmatrix} 0 \\ 1 \\ 1/n_1 \\ 1/n_2 \\ 1/n_3 \end{bmatrix}$$

$$R_1 = \begin{bmatrix} r^I & r^{II} & r^{III} & r^{IV} & r^V & r^{VI} \end{bmatrix}$$

finding and selecting a plurality of bands with values ranking top in $R_1$ or selecting those bands with correlation coefficients exceeding a predetermined value as remote sensing bands with higher correlation.

9. The surface water quality monitoring method based on the high spatial resolution satellite according to claim 1, wherein in the step 4, data of monitoring points, that is, a spectral reflectance correlation model, is retrieved and obtained by optimizing the model according to data of the standard surface water quality pools and data of spectral reflectance of corresponding monitoring stations, and the like, and an accuracy of the model is tested with a multiple correlation coefficient $R^2$, the optimal retrieval band and band combination of each water quality index are determined by performing statistical analysis of a correlation between each band, band combination and corresponding water quality index data, and a retrieval regression model of each pollutant concentration is built.

10. The surface water quality monitoring method based on the high spatial resolution satellite according to claim 1, wherein in the step 5, an overall water quality and water quality distribution are allowed to be identified based on the water quality data of the entire lake and river obtained in the step 4 and the preset water quality data threshold, and notification and early warning are allowed to be accordingly given.

* * * * *